Feb. 25, 1930. H. P. OBER 1,748,921
RAILWAY TRAFFIC CONTROLLING SYSTEM
Filed July 25, 1927
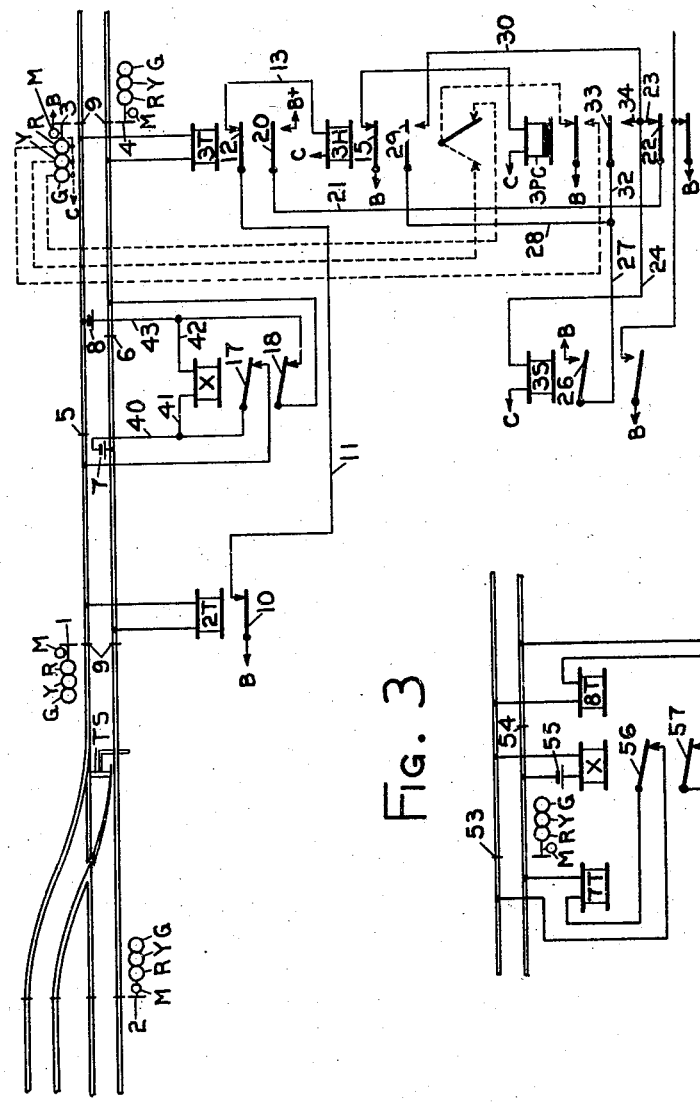

Patented Feb. 25, 1930

1,748,921

UNITED STATES PATENT OFFICE

HERMON P. OBER, OF ROCHESTER, NEW YORK, ASSIGNOR TO GENERAL RAILWAY SIGNAL COMPANY, OF ROCHESTER, NEW YORK

RAILWAY-TRAFFIC-CONTROLLING SYSTEM

Application filed July 25, 1927. Serial No. 208,249.

This invention relates to absolute-permissive-block signaling systems, and more particularly to a light signaling system of this type in which direct current track circuits are employed.

As is well known by those skilled in the art of A. P. B. signaling, there is employed in such signaling a directional stick relay, which if once picked up is stuck up so long as the associated home relay remains de-energized, and serves to permit the next signal in the rear to go to caution even though the associated home relay of such stick relay is de-energized. For this reason, it is important to avoid this directional stick relay picking up momentarily at a time when the home relay is down and when traffic conditions are such that the stick relay should not be energized. In A. P. B. systems it is quite common to employ cut track sections resulting in a plurality of track circuits per block, and it has been experienced where direct current track circuits are used that a home relay controlled through the front contact of two successive track relays, that this home relay is apt to pick up momentarily when a short train passes from one track circuit onto the next track circuit; this because the dropping of the energized track relay is considerably delayed in that among other things it is short circuited when de-energized by a passing train, whereas the track relay of the section just occupied by such moving train picks up very quickly, and in some cases has actually been known to pick up before the track relay of the section in advance dropped, so that the circuit for the home relay controlled through front contacts of such track relays in series would in that case be momentarily picked up. As is readily appreciated by one skilled in the art of A. P. B. signaling, such momentarily picking up of the home relay may cause false energization of the directional stick relay.

With the foregoing and other important considerations in mind, it is proposed in accordance with the present invention to avoid the home relay controlled by front contacts of the track relays of two successive track sections being momentarily picked up, even though there is a very short train moving from one track section upon the next track section at a high speed. Generally speaking, it is proposed to stagger the insulated joints between two successive track sections, and to provide suitable means whereby the track batteries of both of the two successive track sections are cut off of their respective track relays so long as there is a wheel and axle between the insulating joints of the staggered junction of the two successive track sections. More specifically, it is proposed to provide a relay in such a manner between these staggered joints that this relay is energized when a wheel and axle bridges rails between the staggered joints of the junction between two successive track sections.

Other objects, purposes and characteristic features of the invention will appear as the description thereof progresses.

In describing the invention in detail reference will be made to the accompanying drawings in which:

Fig. 1 shows a portion of a light signal system of the A. P. B. type employing direct current track circuits and embodying the present invention.

Fig. 2 shows a modified form of the invention in which the junctions of two successive track sections employ a track battery adjacent the junctions in one track section and a track relay adjacent the junctions in the other track section; and Fig. 3 shows still another application of the invention in which each of the adjacent ends of two track sections contain a track relay.

*Structure of Fig. 1.*—Referring to Fig. 1 of the drawings, there has been shown a single track stretch of trackway and the end of a passing siding containing a track switch TS. The portion of the absolute-permissive-block signaling system shown includes the entering stop-and-stay signal 1, the starting stop-and-stay signal 2 and two intermediate permissive signals 3 and 4 respectively. It may be pointed out here that the stop-and-stay signal 2 is distinguishable from any one of the permissive signals 1, 3 and 4, in that the stop-and-stay signal has a marker light M directly in line with the green, yellow and red lamp units G Y and R, respectively, of these light signals, whereas the marker lights M of the permissive signals 3 and 4 are offset with respect to the light signal units thereof.

In order to simplify the description of the present invention the control circuits and relays for the permissive signal 3 only have been shown. The block between the signals 1 and 3 the ends of which are defined by insulating joints 9, has been shown divided into two track sections insulated from each other by insulating joints 5 and 6, although in practice more than two cut sections per block may be employed, if desired. The first of these track sections considering east bound train movement includes a track battery 7 and a track relay 2T, and the other track section includes a track battery 8 and a track relay 3T. It is noted that the home relay 3H is energized through the following circuit:—beginning at the terminal B of a suitable battery, contact 10 of the track relay 2T, wire 11, contact 12 of the track relay 3T, wire 13, winding of the home relay 3H, to the common return wire C connected to the other terminal of the battery containing terminal B. This home relay 3H is a polarized relay and in practice is energized in the normal or reverse direction depending upon whether the signal in advance of the signal 3 is at stop or at proceed, that is, the terminal B may be either positive or negative.

This relay 3H, by its front contact 15, directly controls the energization of the slow dropping pole changer relay 3PC. The pole changer relay 3PC is preferably made slow to drop for two reasons, namely, first, to permit the picking up of the stick relay 3S in a manner as more thoroughly pointed out hereinafter and, second to avoid flashing of the red light R of the signal 3 due to momentary de-energization of the relay 3PC, while the polar relay 3H is changed from its normal energized condition to its reverse energized condition. The manner in which the directional stick relay 3S is picked up if the home relay 3H is momentarily energized, and the manner in which it is controlled, is more readily pointed out in connection with the operation of the system. It should be noted that the insulating joints 5 and 6 separating the two track sections in question are staggered, and that if there is a wheel and axle between these staggered insulating joints that the relay X will be picked up, because a circuit including the winding of this relay X and the two batteries 7 and 8 in series is completed. Further, it will be noted that when the relay X is in its energized condition that the track battery 7 is cut off of its track section by reason of opening of contact 17 of the relay X, and that the track battery 8 is cut off of its track section by reason of the opening of contact 18.

*Operation Fig. 1.*—Let us first consider the movement of a train from right to left by the signal 3, and let us observe how the stick relay 3S is picked up in order to permit another train to follow the train in question. When the west bound train, moving from right to left, passes the signal 3, it treads upon the track circuit containing track relay 3T and effects de-energization of this relay 3T, and dropping of relay 3T in turn effects de-energization of the home relay 3H, and the dropping of which in turn de-energizes the pole changer relay 3PC. Since, however, a considerable delay in the dropping of the contacts of the pole changer relay 3PC is experienced, because this relay 3PC is slow dropping, a pick up circuit for the stick relay 3S is temporarily established which may be traced as follows:—beginning at the terminal B, back contact 20 of the track relay 3T, wire 21, front contact 22 of the pole changer relay 3PC, wires 23 and 24, winding of the directional stick relay 3S, to the common return wire C connected to the other side of the battery containing terminal B.

Since the home relay 3H drops quicker than the pole changer relay 3PC the following stick circuit is completed before the pick up circuit just traced is broken:—beginning at the terminal B, front stick contact 26 of the stick relay 3S, wires 27 and 28, back contact 29 of the home relay 3H, wires 30 and 24, winding of the stick relay 3S, to the common return wire C. After another short interval of time the relay 3PC will have assumed its de-energized condition and thereby will have completed the following additional stick circuit for the relay 3S:—beginning at the terminal B, contact 26 of the stick relay 3S, wires 27 and 32, back contact 33 of the pole changer relay 3PC, wires 34 and 24, winding of the stick relay 3S, to the common wire C.

It is thus noted that the movement of a train from right to left by the signal 3 causes the stick relay 3S to be picked up and stuck up, during the continuance of the movement of the train from right to left between the signals 3 and 1 the home relay 3H remains de-energized for train lengths and train speeds ordinarily employed in practice and thereby maintains the relay 3S stuck up. When this train moves off of the last section in this block the track relays 3T and 2T will both be up thus causing the home relay 3H to again be energized and in turn causing the pole changer relay 3PC to be energized and the stick relay 3S to be de-energized, for obvious reasons. Had the train in question been a very short train and had it moved at a rather high speed, assuming that the relay X forming an essential part of the present invention had not been used in this system, the movement of the train from the track section containing track relay 3T upon the track section containing track relay 2T might have allowed the track relay 3T to be picked up before the track relay 2T dropped and thereby might have momentarily picked up the home relay 3H. In this connection it is desired to point out that a direct current track relay when shunted by the presence of a train which shunts its winding, causes its winding to act like a bucking coil in which short circuited current flows which tends to prevent a change in flux in the magnetic structure of such track relay, so that the track relay is very slow in opening its contacts, whereas the clearing of a track circuit causes the track relay to pick up very quickly, because there is then no short circuited coil linking the magnetic structure of the track relay. In other words, track relays of the direct current type are very slow in dropping but are rather quick in picking up. The momentary energization of the relay 3H for reasons just mentioned in a system such as shown would permit dropping of the stick relay 3S, which in turn would prevent another train following the train in question. This in itself is not a hazardous or dangerous condition, but is undesirable in that it unnecessarily interferes with the movement of traffic.

If the train in question had been moving from left to right, under which condition of train movement the stick relay 3S would be in its de-energized condition, the momentary picking up and dropping of the home relay 3H, in a system in which the relay X of the present invention is not employed, could have momentarily completed the pick up circuit for the stick relay 3S, and thereby caused this relay 3S to be stuck up. This false picking up of the stick relay 3S would, of course, set up a very dangerous condition because it would permit the entrance of an opposing train with respect to the train in question in the single track section connecting two passing sidings. Although trains moving toward each other in a single track section of an A. P. B. system will in a way be protected by signal indications, these signal indications merely assure braking distance ahead of a moving train, and if two trains are moving toward each other double braking distances is necessary to prevent a collision, so that the signal protection afforded is inadequate.

Let us now see how the introduction of the relay X avoids the momentary picking up of the relay 3H. Let us consider the movement of a train from left to right between the signals 1 and 3 under which condition of train movement the relays 3H, 3PC and 3S will in practice, all assume their de-energized condition, in the first instance this being due to the presence of the train on the track circuit containing the track relay 2T. As this train moves from left to right the moment it passes by the insulated joint 5 the protective relay X is energized through the following circuit:—beginning at the battery 7, wires 40 and 41, winding of the relay X, wires 42 and 43, track battery 8, through the wheels and axles of the train in question back to the battery 7. This energization of the protective relay X will effect raising of the contacts 17 and 18 thereby disconnecting the batteries 7 and 8 from their respective track circuits. Although the operation of these contacts 17 and 18 will not in any way affect the energizing circuit of the relay X including these same batteries 7 and 8, their operation to the raised position opens the two track circuits. It thus appears that so long as any part of the train occupies the tracks between insulating joints 5 and 6 that no track circuit current will be available for energizing either of the track relays 2T or 3T, and that for this reason the home relay 3H will not be momentarily picked up regardless of the length of the train in question or the speed at which it moves from one track section into another; in other words, the applicant has solved the difficulty heretofore mentioned by going to the root of the trouble by avoiding momentary picking up of the home relay 3H.

*Structure Fig. 2.*—In Fig. 2 of the drawings the protective relay X has been shown applied to the junctions between two successive track sections at a signal location where the adjacent ends of two track sections include a track battery 45 and a track relay 5T, respectively. That is, it is the practice in A. P. B. signaling to arrange the track batteries and track relays of a track circuit in such a way that the track relay which directly controls a signal in question is located near such signal. In the arrangement shown the insulating joints 46 and 47 are staggered in the same way as the joints 5 and 6 have been shown staggered in Fig. 1 of the drawings. Also, in Fig. 2 of the drawings the protective relay X when energized opens the track circuits for both of the two adjacent track sections by opening the contacts 48 and 49 of the relay X. The usual limiting resistance 50 has been shown connected in series with the track battery 45. The functioning of the apparatus shown in Fig. 2 of the drawings is exactly the same as that of the apparatus shown in Fig. 1; that is, in each case, in Fig. 1 and in Fig. 2, both of the adjacent track circuits are opened so long as a train bridges the portion of the railway track between the stagger joints of the junctions of the track sections thereof. It will be noted that in Fig. 2 of the drawings there is only one battery, namely the battery 45, in the energizing circuit of the protective relay X when there is a train between the staggered joints of the junctions of the two track sections; whereas two batteries, namely batteries 7 and 8, are contained in the energizing circuit of the relay X of Fig. 1 under similar conditions. The fact that only one battery is connected in the energizing circuit of the relay X in Fig. 2 of the drawings is not material because the relay X will in practice be designed so as to function properly for the number of batteries used in its energizing circuit and the voltage of these batteries. In view of the similarity between the apparatus at the junctions of two successive track circuits, shown in Figs. 1 and 2, it is deemed unnecessary to further discuss the application of the invention as shown in Fig. 2 of the drawings.

*Structure Fig. 3.*—In Fig. 3 of the drawings has been shown an arrangement where the adjacent ends of two track circuited sections of an A. P. B. system contain track relays 7T and 8T respectively. In the arrangement shown in Fig. 3 the insulating joints 53 and 54 have also been staggered for reasons already mentioned in connection with Figs. 1 and 2. By reason of the fact that neither of the adjacent ends of the track sections shown in Fig. 3 of the drawings contain a track battery it is necessary to provide a separate battery for energizing the relay X while a passing train occupies the track rails between the stagger joints 53 and 54. In the arrangement shown there is connected in series with the protective relay X a battery 55. It is thus noted that if there is a train present between the staggered insulating joints 53 and 54, the presence of this train will cause the energizing circuit for the relay X which includes the battery 55 to be completed; and it is further apparent that the relay X so long as energized will open the track circuits of the two adjoining track sections by the opening of contacts 56 and 57, respectively. In other words, in Fig. 3 of the drawings the protective relay X is energized so long as there is a train present on the track between the staggered joints 53 and 54, and with this protective relay X energized the adjacent track circuits will be opened in the same way as those of the arrangement shown in Figs. 1 and 2 of the drawings, so that no detailed description of the operation of the modified form of invention shown in Fig. 3 of the drawings need be given. Although the invention has been shown applied to a signal system employing direct current track circuits it may be applied to a system employing alternating current track circuits, if desired.

Having thus shown several specific embodiments of the present invention, and having shown rather specific circuit arrangements for accomplishing the desired result, it is desired to be understood that this has been done for the purpose of simplifying the description of the invention rather than illustrating its scope or the specific arrangement preferably employed in practicing the same; and it is further desired to be understood that various changes, modifications and additions may be made to the arrangements shown in order to adapt the invention to the particular signaling problem encountered in practicing the invention, all without departing from the spirit or scope of the invention or the idea of means underlying the same, except as demanded by scope of the following claims.

What I claim is:—

1. In a railway signaling system, the combination with a railway track divided into sections by insulated joints; a track circuit of the usual type including a source of energy, the track rails of a section and a track relay connected in series, for each of two successive track sections; and means for opening said two track circuits when a train passes from one track section into the other of said track sections.

2. In a railway signaling system; the combination with a railway track divided into sections by insulated joints placed in staggered relation; a track circuit of the usual type including a source of energy, the track rails of a section and a track relay connected in series, for each of two successive track sections; and means for opening said two track circuits when a train occupies that portion of the track between the staggered insulated joints separating the two adjacent track sections.

3. In a railway signaling system; the combination with a railway track divided into sections by insulated joints placed in staggered relation; a track circuit of the usual type including a source of energy, the track rails of a section and a track relay connected in series, for each of two successive track sections; and means including a protective relay for opening said two track circuits when a train occupies that portion of the track between the staggered insulating joints separating such two adjacent track sections.

4. In a railway signaling system of the absolute-permissive-block type in which it is dangerous for a line relay to be momentarily energized due to the passage of a train; the combination with a railway track divided into sections by insulated joints; a track circuit of the usual type including a source of energy, the track rails of a section and a track relay connected in series, for each of two successive track sections; and means for opening the two track circuits of the two successive sections when a train passes from one track section into the other of said track sections; whereby the line relay controlled by such track circuits is not momentarily energized 5. In a railway signaling system of the absolute-permissive-block type in which it is dangerous for a line relay to be momentarily energized due to the passage of a train; the combination with a railway track divided into sections by insulated joints placed in staggered relation; a track circuit of the usual type including a source of energy, the track rails of a section and a track relay connected in series, for each of two successive track sections; and means for opening the two track circuits for the two successive sections when a train occupies that portion of the track between the staggered insulated joints separating such two adjacent track sections.

6. In a railway signaling system of the absolute-permissive-block type in which it is dangerous for a line relay to be momentarily energized due to the passage of a train, the combination with a railway track divided into sections by insulated joints placed in staggered relation, a track circuit of the usual type for each of two successive sections including a source of energy and a track relay, and means including a protective relay controlled in a manner to open said two track circuits when a train occupies that portion of the track between the staggered insulated joints separating said two adjacent track sections.

7. In a railway signal system, the combination with a railway track divided into blocks by insulated joints, other insulated joints for dividing one of said blocks into track sections which other joints are arranged in staggered relation so as to permit a single axle with its wheels to occupy one rail of each of two successive track sections, a track circuit for each section of said one block each including the usual track battery and a track relay, and a protective relay connected across the rails of the track between said staggered insulating joints, and a back contact of said protective relay connected in one of said track circuits.

8. In a railway signal system, the combination with a railway track divided into blocks by insulated joints, other insulated joints for dividing one of said blocks into track sections which other joints are arranged in staggered relation so as to permit a single axle with its wheels to occupy one rail of each of two successive track sections, a track circuit for each section of said one block each track circuit including the usual track battery and a track relay, and a protective relay connected across the rails of the track between said staggered insulated joints, and two back contacts on said protective relay one contained in one of said track circuits and the other contained in the other of said track circuits.

9. In a railway signal system, the combination with a railway track divided into blocks by insulated joints, other insulated joints for dividing one of said blocks into track sections which other joints are arranged in staggered relation so as to permit a single axle with its wheels to occupy one rail of each of two successive track sections, a track circuit for each section of said one block each including the usual track battery and a track relay, one of said track circuits being arranged to have its track relay located at the end adjacent said staggered joints and the other of said track circuits being so arranged that its track battery is at the end adjacent said staggered joints, a protective relay connected across the rails of the track between said staggered joints, and a back contact of said protective relay connected in one of said track circuits.

10. In a railway signal system, the combination with a railway track divided into blocks by insulated joints, other insulated joints for dividing one of said blocks into track sections which other joints are arranged in staggered relation so as to permit a single axle with its wheels to occupy one rail of each of two successive track sections, a track circuit for each section of said one block each including the usual track battery and a track relay, one of said track circuits being arranged to have its track relay located at the end adjacent said staggered joints and the other of said track circuits being so arranged that its track battery is at the end adjacent said staggered joints, a protective relay connected across the rails of the track between said staggered joints, and a back contact of said protective relay connected in series with said track relay.

11. In a railway signal system, the combination with a railway track divided into blocks by insulated joints, other insulated joints for dividing one of said blocks into track sections which other joints are arranged in staggered relation so as to permit a single axle with its wheels to occupy one rail of each two successive track sections, a track circuit for each section of said one block each including the usual track battery and a track relay, one of said track circuits being arranged to have its track relay located at the end of said staggered joints and the other of said track circuits being so arranged that its track battery is at the end adjacent said staggered joints, and a protective relay connected across the rails of the track between said staggered joints, and a back contact of said protective relay connected in series with said track battery.

12. In a railway signal system, the combination with a railway track divided into blocks by insulated joints, other insulated joints for dividing one of said blocks into track sections which other joints are arranged in staggered relation so as to permit a single axle with its wheels to occupy one rail of each of two successive track sections, a track circuit for each section of said one block each including the usual track battery and a track relay, one of said track circuits being arranged to have its track relay located at the end adjacent said staggered joints, and the other track circuit being arranged to have its track battery located adjacent said staggered joints, and two back contacts on said protective relay one connected in series with said adjacent track battery and the other connected in series with said adjacent track relay, whereby if a train occupies the track between said staggered joints said protective relay is energized and both of said track circuits are opened.

13. In a railway signaling system; the combination with a railway track divided into sections by insulated joints; a track circuit of the usual type including a source of energy, the track rails of a section and a track relay connected in series for each of two successive track sections; a line circuit including front contacts of two track relays in series; and means for preventing momentary closing of said line circuit when a train passes from one track section into the other of said track sections due to slow dropping of one of said track relays.

14. In a railway signaling system; the combination with a railway track divided into sections by insulated joints; a track circuit of the usual type including a source of energy, the track rails of a section and a track relay connected in series, for each of two successive track sections; and means including a protective relay for opening said two track circuits when said insulated joints are bridged by a train.

15. In a railway signaling system of the absolute-permissive-block type in which it is dangerous for a line relay to be momentarily energized due to the passage of a train; the combination with a railway track divided into sections by insulated joints; a track circuit of the usual type including a source of energy, the track rails of a section and a track relay connected in series, for each of two successive track sections; and means for opening the two track circuits for the two successive sections when a train bridges said insulated joints.

16. In a railway signaling system of the absolute-permissive-block type in which it is dangerous for a line relay to be momentarily energized due to the passage of a train, the combination with a railway track divided into sections by insulated joints, a track circuit of the usual type for each of two successive sections including a source of energy and a track relay, and means including a protective relay controlled in a manner to open said two track circuits when a train bridges the track and one of said insulated joints.

17. In a railway signal system, the combination with a railway track divided into blocks by insulated joints, other insulated joints for dividing one of said blocks into track sections, a track circuit for each section of said one block each track circuit including the usual track battery and a track relay, and a protective relay connected across the rails of the track to be energized when one of said other insulated joints are bridged, and two back contacts on said protective relay one contained in one of said track circuits and the other contained in the other of said track circuits.

18. In a railway signal system, the combination with a railway track divided into blocks by insulated joints, other insulated joints for dividing one of said blocks into track sections, a track circuit for each section of said one block each including the usual track battery and a track relay, one of said track circuits being arranged to have its track relay located at the end adjacent said other joints and the other of said track circuits being so arranged that the track battery is at the end adjacent said other joints, a protective relay connected across the rails of the track to be energized when said other joints are bridged by a passing train, and a back contact of said protective relay connected in one of said track circuits.

19. In a railway signal system, the combination with a railway track divided into two adjacent track sections by staggered insulating joints, a track circuit for each of said sections for governing a wayside signal, and a protective relay including a battery in series therewith for governing said wayside signal connected across the rails between said staggered insulating joints, whereby said protective relay is energized so long as a car axle and its associated wheels bridge the rails between said staggered insulating joints.

In testimony whereof I affix my signature.

HERMON P. OBER.